US00RE37835E

(19) United States
(12) Reissued Patent
Kropielnicki et al.

(10) Patent Number: US RE37,835 E
(45) Date of Reissued Patent: Sep. 10, 2002

(54) COIL CONSTRUCTION

(75) Inventors: Jerzy Jacek Kropielnicki, Knutsford; Keith Jeremy Twort, Stockport; Brian Easter, Gwynedd, all of (GB)

(73) Assignee: Glass Antennas Technology Limited, Cheshire (GB)

(21) Appl. No.: 09/432,184

(22) Filed: Nov. 2, 1999

Related U.S. Patent Documents

Reissue of:
(64) Patent No.: 5,835,066
Issued: Nov. 10, 1998
Appl. No.: 08/794,852
Filed: Feb. 5, 1997

U.S. Applications:

(63) Continuation of application No. 08/313,162, filed as application No. PCT/GB93/00481 on Mar. 8, 1993, now abandoned.

(30) Foreign Application Priority Data

Apr. 8, 1992 (GB) ..... 927620

(51) Int. Cl.[7] ..... H01Q 1/02
(52) U.S. Cl. ..... 343/704; 343/860
(58) Field of Search ..... 343/704, 713, 343/788, 856, 860; 219/203, 522; H01Q 1/02, 1/52, 7/06, 7/08

(56) References Cited

U.S. PATENT DOCUMENTS

| | | | | |
|---|---|---|---|---|
| 2,624,004 | A | 12/1952 | Polydoroff | 343/788 |
| 2,836,805 | A | 5/1958 | Goldsmith | 336/136 |
| 3,812,443 | A | 5/1974 | Schroeder | 336/192 |
| 4,063,247 | A | 12/1977 | Sakurai et al. | 343/704 |
| 4,086,594 | A | 4/1978 | Kropielnicki | 343/704 |
| 4,305,785 | A | 12/1981 | Praeg | 324/360 |
| 4,422,077 | A | 12/1983 | Kropielnicki | 343/704 |
| 4,439,771 | A | 3/1984 | Kume et al. | 343/704 |
| 4,583,097 | A | 4/1986 | Kropielnicki | 343/704 |
| 4,654,669 | A | 3/1987 | Kropielnicki | 343/704 |
| 4,761,826 | A | 8/1988 | Kropielnicki | 343/704 |
| 4,903,034 | A | 2/1990 | Kropielnicki | 343/704 |
| 4,903,035 | A | 2/1990 | Kropielnicki | 343/704 |
| 4,928,108 | A | 5/1990 | Kropielnicki | 343/704 |
| 5,293,173 | A | 3/1994 | Kropielnicki | 343/704 |
| 5,293,174 | A | 3/1994 | Kropielnicki | 343/713 |
| 5,835,066 | A | 11/1998 | Kropielnicki | 343/704 |

FOREIGN PATENT DOCUMENTS

| | | |
|---|---|---|
| DE | 3307262 | 9/1984 |
| DE | 3908350 | 9/1990 |
| EP | 0269924 | 6/1988 |
| EP | 0635165 | 7/1998 |
| GB | 1098527 | 1/1968 |
| GB | 1123236 | 8/1968 |
| GB | 1520030 | 8/1978 |
| GB | 1600987 | 10/1981 |
| GB | 2250137 | 5/1992 |
| GB | 2266193 | 10/1993 |
| GB | 2295729 | 6/1996 |
| SU | 244422 | 11/1969 |
| WO | 9101575 | 2/1991 |

*Primary Examiner*—Michael C. Wimer
(74) *Attorney, Agent, or Firm*—Shoemaker and Mattare

(57) ABSTRACT

A bifilar coil construction is used for isolating radio signals picked up by a motor vehicle window heating element from the power supply circuit for the heating element. The coil construction has two separate windings (9,10) which are arranged bodily alongside each other. In one embodiment there is an inner cylindrical winding (9) within and in contact with an outer cylindrical winding (10), and a two part pot core (15,16) is clamped within and around the windings (9,10).

13 Claims, 3 Drawing Sheets

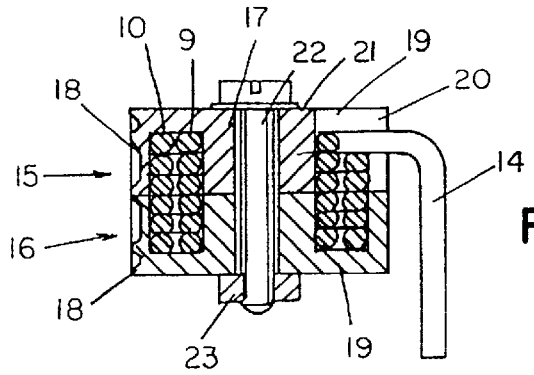
FIG. 2
FIG. 3
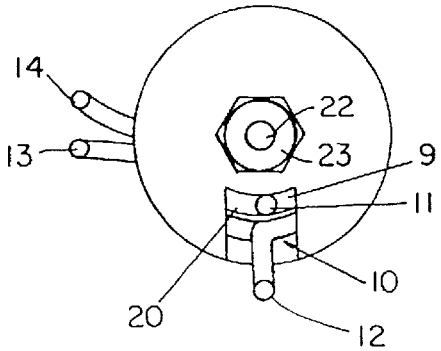
FIG. 4
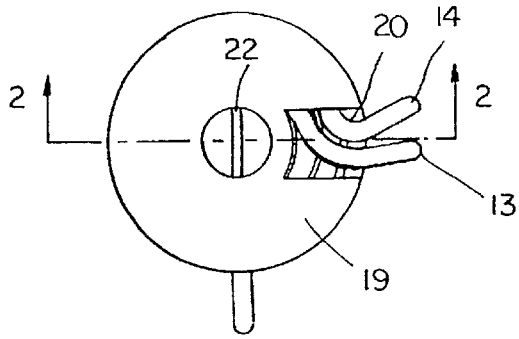
FIG. 5
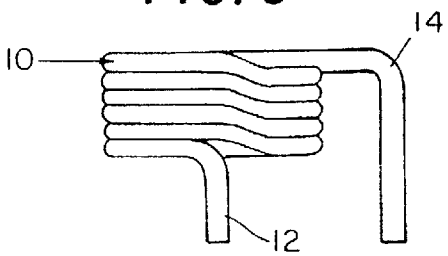
FIG. 6
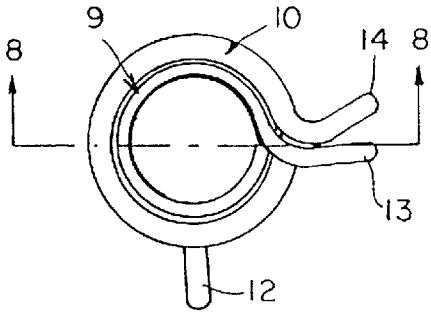
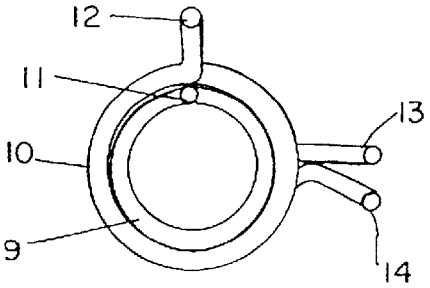
FIG. 7
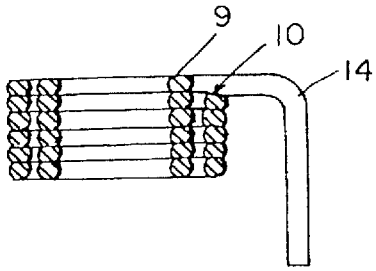
FIG. 8

COIL CONSTRUCTION

Matter enclosed in heavy brackets [ ] appears in the original patent but forms no part of this reissue specification; matter printed in italics indicates the additions made by reissue.

This application is a continuation of application Ser. No. 08/313,162, filed Jan. 17, 1995, abandoned; *which is a 371 of PCT/GB93/00481 filed Mar. 8, 1993.*

TECHNICAL FIELD

This invention relates to a bifilar coil construction.

BACKGROUND ART

British patents GB 1520030 and GB 1600987 describe signal separating devices which act to isolate the d.c. power supply circuit for the heating element of an electrically heated motor vehicle window from the antenna circuit of a radio receiver or transmitter connected to the heating element, so that the heating element can be used simultaneously for heating purposes and as a radio transmitting or receiving antenna.

The described devices use a bifilar coil for signal separation purposes. The two windings of the coil are connected respectively between opposite ends of the heating element and positive and negative terminals of the d.c. power supply circuit, whereby the coil can present a high blocking impedance to radio signals with a low resistance for d.c. currents. Signal separation can therefore be effected in a particularly convenient and efficient manner.

Conventionally, bifilar coils are manufactured by machine-winding two side-by-side wires together around a former. This results in two windings which are wound in a common direction, which have a common diameter and axial length, and the turns of which lie axially next to each other. For signal separation purposes as mentioned above, the windings are enclosed within a pot core structure (ferrous ceramic structure) with ends of the windings projecting axially downwardly through openings in the structure for connection purposes.

Present trends are towards the use of higher current consumption motor vehicle window heating elements, say 30 amps or more, and there is therefore a requirement for bifilar coils with thicker gauge windings. However, with the abovementioned conventional construction, thicker gauge windings result in increased axial bulk which is undesirable. An axially compact construction is desirable to permit easy mounting at a required position close to the motor vehicle window so as to minimise tuning problems due to lead inductance and capacitance. Also, with the conventional construction, the projecting connection ends of the windings follow a curved or bent path where they feed into the adjacent end turns and, in the case of axially side-by-side thicker gauge wires this adds considerably to the axial bulk and also can be difficult to achieve or control with conventional winding equipment.

An object of the present invention is to provide a signal separating device having a doublewound coil construction which can be easily and conveniently manufactured, and with which axial bulk can be minimised, even with thicker gauge wires.

DISCLOSURE OF THE INVENTION

Thus, and in accordance with one aspect of the present invention there is provided a signal separating device for use with a motor vehicle window heating element, said device having a pair of first terminals for connection to the heating element, a pair of second terminals for connection with the motor vehicle d.c. power supply for the heating element, an antenna terminal for connection to the antenna circuit of motor vehicle radio transmitting and/or [receciving] *receiving* apparatus, and a double wound coil having first and second windings of common direction interposed between the pair of first terminals and the pair of second terminals so as to permit passage of d.c. current from the power supply to the heating element whilst blocking passage of radio signals from the heating element to the d.c. power supply, the antenna terminal being connected between the heating element and the double wound coil, the windings of the double wound coil being separately formed windings disposed bodily alongside each other and a ferrous core being provided having inner and outer parts respectively within and around the coil structure, the separate windings of the double wound coil comprising first and second generally cylindrical windings of different diameters whereby the first winding fits closely within the second winding with the turns of the first winding spaced radially inwardly of the turns of the second winding, said first and second windings having a substantially identical number of turns thereto.

The signal separating device may include other components as appropriate for example including capacitors, diodes, chokes, matching circuitry for matching the heating element to the antenna circuit of the radio apparatus, and tuning circuitry to give efficient operation at different frequency bands (am, vhf).

The separate windings of the doublewound coil construction of the invention may comprise two cylindrical (or generally cylindrical) windings which are of slightly different diameters so that the first winding can fit closely within the second winding, the turns of the first winding therefore being spaced radially inwardly of the turns of the second winding.

Thus, and in accordance with a second aspect of the present invention, there is provided a method of manufacturing the signal separating device of the first aspect of the invention wherein a method of manufacturing a signal separating device according to any one of claims 1 to 3 including forming the first winding as a generally cylindrical coil from wire having a transverse dimension of greater than 2 mm, forming the second winding as a separate generally cylindrical coil from the same wire having an internal diameter greater than the external diameter of the coil of the first winding, fitting the first winding within the second winding and placing the double wound coil so formed within a 30 mm pot core having inner and outer parts respectively with and around the coil structure whereby a current carrying capability of between 25 to 35 amps is possible in said windings.

Preferably the said internal and external diameters are closely similar so that the outer surface of the first winding contacts or is in close proximity to the inner surface of the second winding for maximum space saving.

With this method, the windings can be formed easily and conveniently, even with thicker gauge wire, especially because the ends of the windings are fed into the adjacent end turns as single wires whereby bends or curves between the ends and the turns can be readily accommodated. Since the winding turns are radially spaced the axial bulk can be kept to a minimum, and the fact that the said bends or curves of the ends occur in single, rather than twin wires can also assist in this respect.

With inner and outer windings, the overall coil structure is of generally cylindrical form and it is possible (and preferred) to use a conventional core having inner and outer cylindrical parts, respectively within and around the coil structure, joined by integral end plates. The core may be a pot core and may be formed in two sections which are clamped together by an axially extending clamping device such as a nut and bolt. Appropriate slots may be provided for the connection ends.

In one embodiment each winding has final top and bottom turns which terminate in respective bent ends with straight terminal end portions which project alongside the coil in the axial direction of the coil. Preferably, the bottom said terminal end portion projects downwardly freely away from the coil, and the top said terminal end portion projects downwardly freely from the coil alongside and spaced from the outer surface thereof. Preferably also, the terminal end portions are spaced circumferentially from each other.

In a particularly preferred embodiment, at least one of the top and bottom bent ends is stepped sideways so that the top terminal end portions of the two windings are spaced apart from each other, as also are the bottom terminal end portions.

The core may have top and bottom radially extending slots through which the top bent ends and the bottom bent ends respectively project.

Alternatively, the separate windings may comprise two spiral (or helical) windings disposed one on top of the other. This results in a "flat", or reduced axial bulk, construction and the ends of the windings can be readily separately turned up or down or otherwise bent to form connections without unduly axially displacing the turn structure of the windings. This embodiment is shown in FIGS. 9a, 9b and 9c.

Thus, and in accordance with a fourth aspect of the present invention there is provided a method of manufacturing the bifilar coil construction of the first aspect of the invention wherein the two windings are formed as spiral or helical coils, and said coils are disposed axially one on top of the other.

Preferably the coils are of common diameter and are disposed in contact with each other.

BRIEF DESCRIPTION OF THE DRAWINGS

The invention will now be described further by way of example only and with reference to the accompanying drawings in which:

FIG. 2 is a sectional view through the bifilar coil construction on the line A—A of FIG. 4;

FIGS. 3 and 4 are views from below and above of the construction of FIG. 2;

FIG. 5 is a side view of the outer winding of the coil construction.

FIGS. 6 and 7 are views from above and below of the two windings of the coil construction; and FIG. 8 is a sectional view on the line B—B of FIG. 6.

BEST MODE OF CARRYING OUT THE INVENTION

Figure 1:
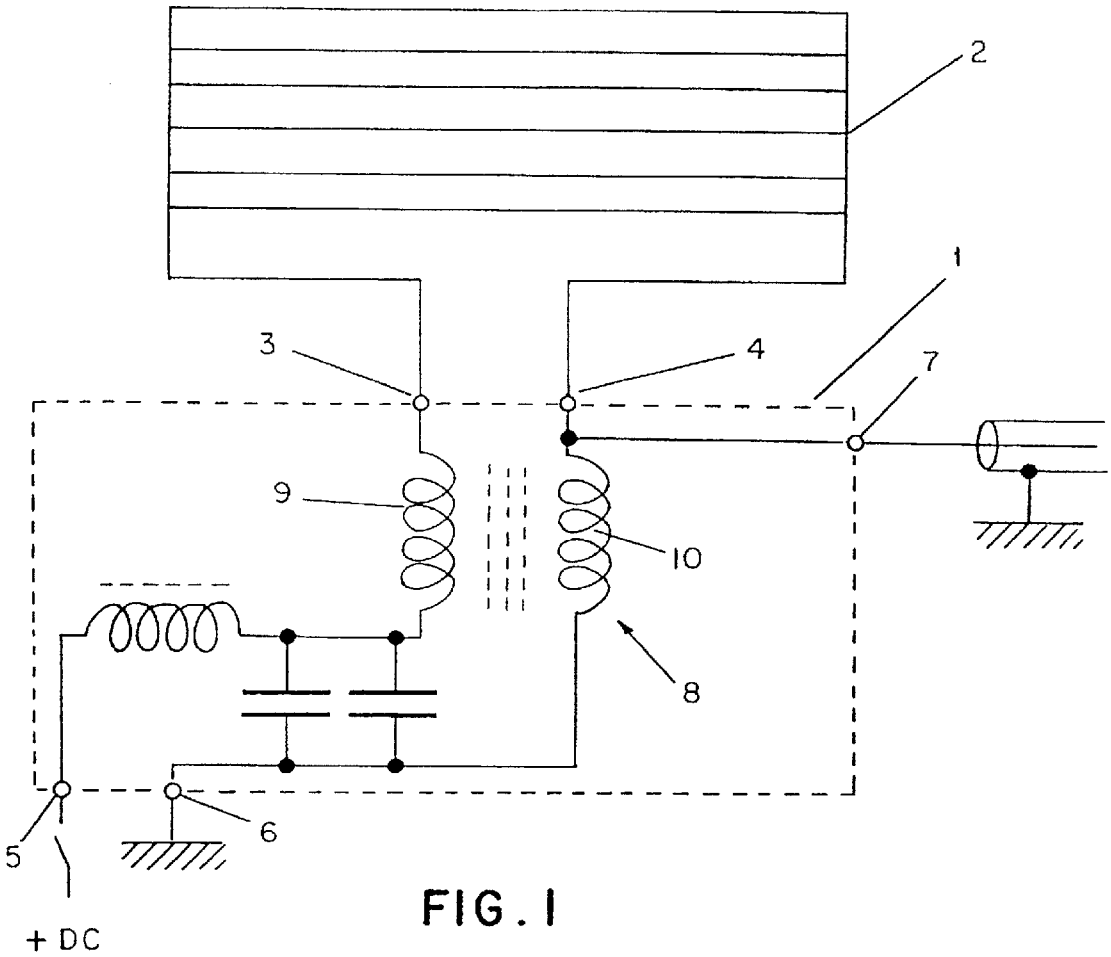
FIG. 1 is a simplified diagram of one form of a signal separating device including a bifilar coil construction according to one embodiment of the invention.
Figure 9A:
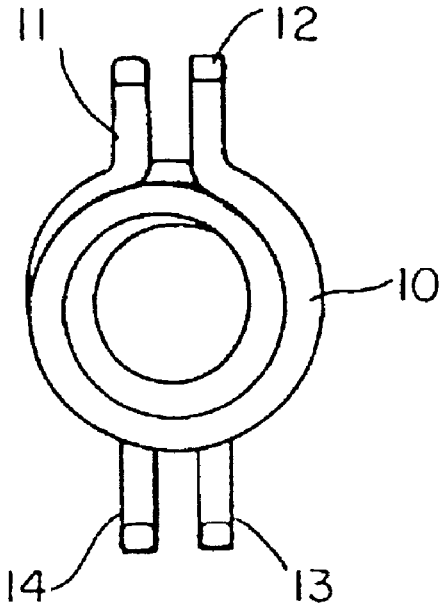
FIG. 9 comprises FIGS. 9a (topview), 9b and 9c (sectional view of FIG. 9b) depicting the spiral (or helical) windings embodiment of the present invention.
Figure 9B:
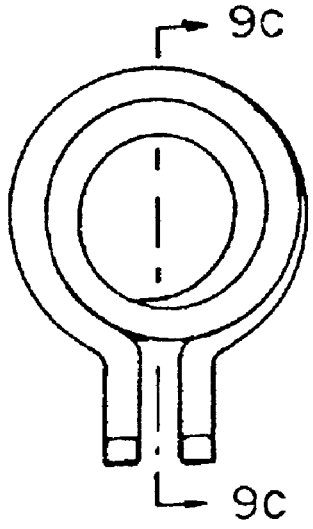
Figure 9C:
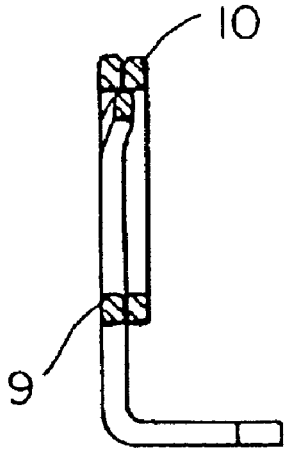

The signal separating device shown is for use with a conventional heated rear window of a motor car to enable this to be used as a receiving antenna for a car radio.

The device comprises a housed circuit 1 which is fixed close to the heated window 2 e.g. beneath the rear parcel shelf or within the roof lining.

The housed circuit 1 has five terminals, 3, 4, 5, 6, 7, two of which 3, 4 are connected to the heating element 2 of the window, another two of which 5, 6 are connected to d.c. positive and earth of the car d.c. power supply via the usual dash board switch, and the other of which 7 is connected by a shielded cable to the car radio antenna input circuit.

The housed circuit 1 includes a bifilar coil 8 having two windings 9, 10 of common direction or hand which are interposed respectively between d.c. positive and earth and the two ends of the heating element 2.

The antenna terminal 7 is linked to the heating element 2 between the heating element 2 and the bifilar coil construction 8. Other components for matching, tuning, assistance in isolation, balancing of the signals at the ends of the heating element etc. may be incorporated but are not all shown here.

The bifilar coil construction comprises two separate windings 9, 10 each of say 5 turns of a thick gauge copper wire capable of carrying said 30 amps without overheating and without significant voltage loss due to resistance.

Each winding coil 9, 10 has a bottom turn which terminates in a downwardly bent end 11, 12 projecting freely away from the coil parallel to its axis. Each coil also has a top turn which terminates in a downwardly bent end 13, 14 projecting freely from the coil alongside and spaced from the outersurface of the coil parallel to its axis.

The inner coil 9 has an outer diameter which is very slightly smaller than the inner diameter of the outer coil 10. The end 11 of the inner coil is bent directly downwardly whereas the ends 13, 12, 14 of the inner and outer coil are stepped to one side before being bent downwardly.

The inner coil 9 is fitted within the outer coil 10 so that they are closely in contact with each other. The bottom projecting ends 11, 12 are alongside each other but are spaced apart due to the above mentioned stepping. A similar arrangement applies to the top projecting ends 13, 14.

Due to the fact that the end 11 is bent directly downwards whereas the other ends 12–14 are stepped as described, it will be understood that the coil 9 can be quickly and easily inserted into the coil 10 after winding without any further bending or forming of the ends 11–14.

The coils so far described can be readily formed with a conventional winding machine since it is a single wire which is being wound. In particular, the ends 11, 12, 13, 14 can be readily bent and fed in to (or fed out of) the associated end turn in a particularly simple and accurate manner, and without requiring undue axial distortion or displacement of the end turn, even with the thick gauge wire.

The resulting coil construction 8 has reduced axial bulk due to the radial spacing of the turns of the two windings 9, 10 and due to the above mentioned reduced displacement of the end turns.

The coil construction 8 is accurately shaped and configured and so it can be easily assembled with a conventional pot core, as shown in the drawing.

The pot core is formed in two halves 15, 16 each consisting of an inner hollow cylinder, 17, an outer hollow cylinder 18 and an end plate 19. These cylinders 17, 18 and the end plate 19 are formed integrally in one piece from a ferrous ceramic structure.

There is a gap in the outer cylinder 18 and the end plate 19 forming a radial slot 20, and there is a central hole 21 in the end plate 19.

The core halves 15, 16 are assembled top and bottom around the coil construction with the radial slots 20 offset to receive the projecting ends 11, 12, 13, 14. The halves 15, 16 are clamped in position tightly in contact with each other with a bolt 22 passed through the holes 21 and the inner cylinders 17 and engaging a nut 23.

It is of course to be understood that the invention is not intended to be restricted to the details of the above embodiment which are described by way of example only.

We claim:

1. A signal separating device for use with a window heating element (2) of a motor vehicle, the signal separating device (1) having a first pair of terminals (3,4) for connection to the heating element (2), a second pair of terminals (5,6) for connection to d.c. power supply for the heating element, and an antenna terminal (7) for connection to radio transmitting and/or receiving apparatus, in which the separating device (1) includes a double-wound coil (8) having first and second separate and generally cylindrical coil windings (9,10) wound in the same direction and formed and disposed such that the first coil winding (9) closely fits within the second coil winding (10) with the turns of the first winding (9) being radially inward of the turns of the second winding (10), the said windings having the same number of turns as one another, said heating element (2) being connected in series between said windings.

2. A signal separating device according to claim 1 in which the antenna terminal (7) is connected intermediate the heating element and the double-wound coil.

3. A signal separating device according to claim 1 further comprising circuit components for matching, tuning, assistance in isolation or balancing of signals.

4. A signal separating device according to claim 1 in which each separate coil winding is formed from wire, at least one end portion of which projects axially of the winding.

5. A signal separating device according to claim 4 in which at least one of the said end portions is radially displaced from the coil winding by a radial portion of wire.

6. A signal separating device according to claim 1 further comprising a pot core having two sections (15,16), each section having inner (17) and outer (18) cylindrical parts respectively within and around said double-wound coil (8), wherein said two sections are clamped together tightly in contact with each other by a bolt (22) and nut (23) which extend axially of said coil.

7. A signal separating device according to claim 1 in which said coil windings are capable of carrying a current of 30 A without overheating and without significant voltage loss due to resistance.

[8. A signal separating device according to claim 1 wherein said double-wound coil and its first and second coil windings are formed as spiral or helical coils and which are disposed axially one on top of the other, said coils being of common diameter and disposed in contact with each other, thereby resulting in a flat and reduced axial bulk coil construction.]

[9. A signal separating device according to claim 8 further comprising a pot core and wherein said spiral or helical coils have central apertures to receive a central part of said pot core.]

10. A signal separating device according to claim 1 wherein each of said separate coil windings (9,10) includes one bottom turn coil end (11,12) and one top turn coil end (13,14), each of said bottom and top coil ends terminating in a downwardly bent end, said one bottom turn coil end (11) of said first coil winding (9) projecting downwardly and axially away from the said first coil winding inside its outersurface and parallel to its axis, and said one bottom turn coil end (12) of said second coil winding (10) and said top turn coil ends (13,14) projecting freely away from and downwardly alongside the outersurface of their respective coil windings.

11. A signal separating device according to claim 6 wherein each of said separate coil windings (9,10) includes one bottom turn coil end (11,12) and one top turn coil end (13,14), each of said bottom and top coil ends terminating in a downwardly bent end, said one bottom turn coil end (11) of said first coil winding (9) projecting downwardly and axially away from the said first coil winding inside its outersurface and parallel to its axis, and said one bottom turn coil end (12) of said second coil winding (10) and said top turn coil ends (13,14) projecting freely away from and downwardly alongside the outersurface of its respective coil winding.

12. A signal separating device according to claim 11 wherein said bottom and top turn coil ends (11,12,13,14) are received within and extend through offset radial slots (20) of said pot core.

13. A signal separating device according to claim 12 wherein said radial slots (20) are provided within and by said two sections (15,16) of the said pot core.

*14. A signal separating device for use with a window heating element (2) of a motor vehicle, the signal separating device (1) having*

*a first pair of terminals (3,4) for connection to the heating element (2),*

*a second pair of terminals (5,6) for connection to a d.c. power supply for the heating element and*

*an antenna terminal (7) for connection to radio transmitting and/or receiving apparatus,*

*the separating device (1) including a double-wound coil (8) having first and second separate coil windings wherein said double-wound coil and its first and second coil windings are formed as spiral or helical coils and which are disposed axially one on top of the other said coils being of common diameter and disposed in contact with each other thereby resulting in a flat and reduced axial bulk construction.*

*15. A signal separating device according to claim 14, further comprising a pot core and wherein said spiral or helical coils have central apertures to receive a central part of said pot core.*

* * * * *